US009062966B2

(12) United States Patent
Jeong

(10) Patent No.: US 9,062,966 B2
(45) Date of Patent: Jun. 23, 2015

(54) METHOD OF INSPECTING A THREE DIMENSIONAL SHAPE

(75) Inventor: Joong-Ki Jeong, Seoul (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 554 days.

(21) Appl. No.: 13/017,784

(22) Filed: Jan. 31, 2011

(65) Prior Publication Data

US 2011/0191050 A1    Aug. 4, 2011

(30) Foreign Application Priority Data

Feb. 1, 2010  (KR) ........................ 10-2010-0008958

(51) Int. Cl.
*G01N 21/17* (2006.01)
*G01N 21/19* (2006.01)
*G01B 15/02* (2006.01)
*G01B 15/06* (2006.01)
*G01B 11/24* (2006.01)
*G06F 19/00* (2011.01)

(52) U.S. Cl.
CPC ................ *G01B 11/24* (2013.01); *G06F 19/00* (2013.01)

(58) Field of Classification Search
CPC ....................................................... G01B 11/16
USPC ............... 702/81, 82, 85, 179, 182, 183, 186; 355/72; 356/394; 382/141; 716/50
See application file for complete search history.

(56) References Cited

U.S. PATENT DOCUMENTS 4,978,224 A * 12/1990 Kishimoto et al. ............ 356/394
5,039,868 A *  8/1991 Kobayashi et al. ...... 250/559.08
5,076,697 A * 12/1991 Takagi et al. .................. 356/603
7,019,826 B2 *  3/2006 Vook et al. .................. 356/237.1
7,559,047 B2 *  7/2009 Miyamoto et al. .............. 716/50
7,684,052 B2 *  3/2010 Suwa et al. .................... 356/601
8,260,030 B2 *  9/2012 Kim et al. ...................... 382/141
2001/0012107 A1 *  8/2001 Toh ................................ 356/601
2011/0157577 A1 *  6/2011 Dohse ............................. 355/72
2011/0279798 A1 * 11/2011 Danbata et al. ................. 355/53

FOREIGN PATENT DOCUMENTS

| CN | 1191967 | 9/1998 |
|----|---------|--------|
| CN | 1761883 | 4/2006 |
| JP | 02-202678 | 8/1990 |
| JP | 02-251714 | 10/1990 |
| JP | 08-210820 | 8/1996 |
| JP | 10-150298 | 6/1998 |
| JP | 11-295036 | 10/1999 |
| JP | 2002-277406 | 9/2002 |

* cited by examiner

*Primary Examiner* — Eliseo Ramos Feliciano
*Assistant Examiner* — Felix Suarez
(74) *Attorney, Agent, or Firm* — Kile Park Reed & Houtteman PLLC

(57) ABSTRACT

In order to inspect a three dimensional shape, a predetermined inspection target component formed on a board is selected as the measurement target, a shape of the inspection target component is acquired, a reference point of the inspection target component is detected, relative location information of a polarity mark formed on the inspection target component with respect to the reference point is acquired, and it is judged whether the inspection target component is good or bad by checking whether the polarity mark exists or not by using the relative location information with respect to the reference point. Thus, the location of the polarity mark may be accurately known, and polarity inspection may be more easily and accurately performed.

15 Claims, 7 Drawing Sheets

METHOD OF INSPECTING A THREE DIMENSIONAL SHAPE

CROSS REFERENCE TO RELATED APPLICATION

This application claims priority from and the benefit of Korean Patent Applications No. 2010-8958 filed on Feb. 1, 2010, which is hereby incorporated by reference for all purposes as if fully set forth herein.

BACKGROUND OF THE INVENTION

1. Field of the Invention

Exemplary embodiments of the present invention relate to a method of inspecting a three dimensional shape. More particularly, exemplary embodiments of the present invention relate to a method of inspecting a three dimensional shape for inspecting polarity of an inspection target component.

2. Discussion of the Background

Generally, electronic device includes at least one printed circuit board (PCB), and various elements are mounted on the PCB. A three dimensional shape measurement apparatus is used to inspect badness of the elements, etc.

The various typed polarity marks are typically formed on various shaped elements. In case that each polarity mark of the elements is located at a location that is expected when designing the PCB, the PCB is properly operated. Thus, the location of the polarity mark may correspond to a criterion for judging whether the elements are properly mounted on the PCB.

Conventionally, a method that it is checked that the polarity mark is properly located by acquiring and observing 2D images of the elements has been used. However, when using the polarity inspection method, there are many cases that it is difficult to know the location of the polarity mark by using the 2D image. For example, in case that the polarity corresponds to a stepped portion having the same color and a different height in comparison with an adjacent area, it is difficult to inspect the polarity by using the 2D image.

Thus, a method for accurately knowing the location of the polarity mark is requested.

SUMMARY OF THE INVENTION

Exemplary embodiments of the present invention provide a method of inspecting a three dimensional shape capable of easily and accurately performing a polarity inspection by accurately obtaining a location of a polarity mark.

Additional features of the invention will be set forth in the description which follows, and in part will be apparent from the description, or may be learned by practice of the invention.

An exemplary embodiment of the present invention discloses a method of inspecting a three dimensional shape, in which light generated from an illumination device is illuminated onto a measurement target to capture an image, and a three dimensional shape based on height information of the measurement target is acquired by using the captured image, to inspect whether the measurement target is good or bad. The method includes selecting a predetermined inspection target component formed on a board as the measurement target, acquiring a shape of the inspection target component, detecting a reference point of the inspection target component, acquiring relative location information of a polarity mark formed on the inspection target component with respect to the reference point, and judging whether the inspection target component is good or bad by checking whether the polarity mark exists or not by using the relative location information with respect to the reference point.

In an exemplary embodiment, the light generated from the illumination device may correspond to grating pattern light, and the captured image may correspond to a pattern image.

In an exemplary embodiment, prior to acquiring the shape of the inspection target component, an inspection area of the inspection target component may be set up.

In an exemplary embodiment, the shape of the inspection target component may be acquired as a three dimensional shape based on height information, and it may be checked whether the polarity mark exists or not by using height information of the inspection target component.

In judging whether the inspection target component is good or bad by checking whether the polarity mark exists or not by using the relative location information with respect to the reference point, it may be checked whether the polarity mark exists or not at a location at which the polarity mark is expected to exist by using the measured height information of the inspection target component by using the relative location information with respect to the reference point, to judge that the inspection target component is good in case that the polarity mark exists and the inspection target component is bad in case that the polarity mark does not exist.

Alternatively, judging whether the inspection target component is good or bad by checking whether the polarity mark exists or not by using the relative location information with respect to the reference point may include detecting a location of the polarity mark by using the height information of the inspection target component, and judging whether the inspection target component is good or bad by comparing the relative location information with respect to the reference point with the detected location of the polarity mark.

In such a case, detecting a location of the polarity mark by using the height information of the inspection target component may include checking whether the polarity mark exists or not at a first location at which the polarity mark is expected to exist by using the relative location information with respect to the reference point, by using the measured height information of the inspection target component, to detect the location of the polarity mark, and detecting the location of the polarity mark by checking whether the polarity mark exists or not at a second location at which the inspection target component is twisted by a predetermined angle, by using the measured height information of the inspection target component, in case that the polarity mark does not exist at the first location. After detecting the location of the polarity mark by checking whether the polarity mark exists or not at a second location at which the inspection target component is twisted by a predetermined angle, by using the measured height information of the inspection target component, the location of the polarity mark may be detected by checking whether the polarity mark exists or not at a third location at which the inspection target component is rotated by a predetermined angle, by using the measured height information of the inspection target component, in case that the polarity mark does not exist at the second location.

In an exemplary embodiment, the polarity mark formed on the inspection target component may have a height different from an area on the inspection target component adjacent to the polarity mark. The inspection target component may employ one of a dimple formed on an upper face and a chamfer formed at an edge serving as the polarity mark.

The relative location information of the polarity mark formed on the inspection target component with respect to the reference point may be acquired from CAD information, in which a shape of the inspection target component is recorded or learning information obtained by a learning mode.

Another exemplary embodiment of the present invention discloses a method of inspecting a three dimensional shape, in which light generated from an illumination device is illuminated onto a measurement target to capture an image, and a three dimensional shape based on height information of the measurement target is acquired by using the captured image, to inspect whether the measurement target is good or bad. The method includes selecting a predetermined inspection target component formed on a base board of a PCB as the measurement target, determining an inspection type of the inspection target component as a 2D inspection type or a 3D inspection type, performing a first inspection process, in case that the inspection type of the inspection target component is determined as the 2D inspection type, and performing a second inspection process, in case that the inspection type of the inspection target component is determined as the 3D inspection type. The first inspection process includes acquiring a 2D image of the inspection target component, and analyzing a location of a polarity mark of the inspection target component to judge whether the inspection target component is good or bad. The second inspection process includes detecting a reference point of the inspection target component, acquiring relative location information of the polarity mark formed on the inspection target component with respect to the reference point, detecting a location of the polarity mark by using height information acquired during measuring the relative location information with respect to the reference point and a three dimensional shape of the inspection target component, and judging whether the inspection target component is good or bad by using the relative location information of the polarity mark with respect to the reference point.

In an exemplary embodiment, a first area of the inspection target component may be determined as the 2D inspection type, and a second area of the inspection target component is determined as the 3D inspection type.

In an exemplary embodiment, the inspection type of the inspection target component may be determined as the 2D inspection type, in case that the polarity mark formed on the inspection target component has a height substantially the same as an area on the inspection target component adjacent to the polarity mark. The inspection target component may employ one of a symbol that is formed on a predetermined area of an upper face, a portion that is colored different from the area adjacent to the polarity mark, and an area definition that is indicated to be discriminated from the area adjacent to the polarity mark as the polarity mark.

In another exemplary embodiment, the inspection type of the inspection target component may be determined as the 3D inspection type, in case that the polarity mark formed on the inspection target component has a height different from an area on the inspection target component adjacent to the polarity mark.

According to the present invention, the reference point of the inspection target component is detected, and the theoretical location information with respect to the reference point is compared with the real location of the polarity mark detected by the height information of the inspection target component, to judge whether the inspection target component is good or bad. Thus, the polarity inspection may be easily and accurately performed.

In addition, the height information of the inspection target component may be acquired by information from three dimensional shape measurement. Thus, additional required inspection time may not be much increased.

In addition, the polarity inspection may be performed divided into the 2D inspection type and the 3D inspection type according to the inspection type of the inspection target component, and the polarity inspection of the inspection target component, which is hard to judge by 2D image, may be easily and accurately performed by using the height information. Thus, the polarity inspection may be more easy and accurate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
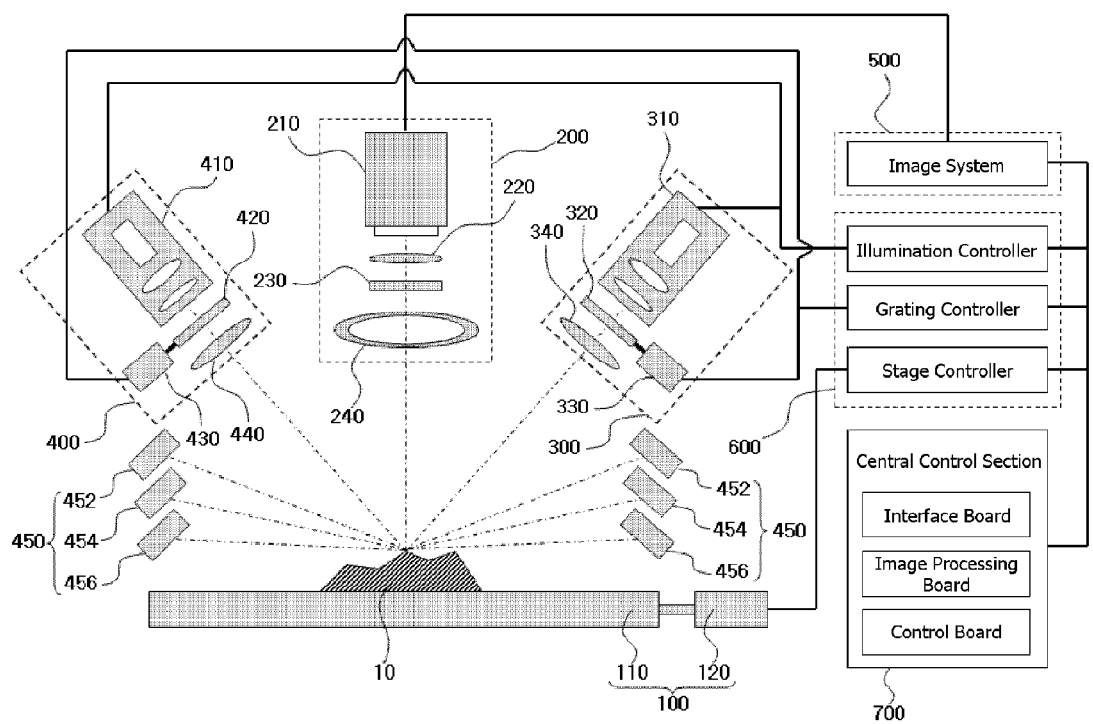
FIG. 1 is a schematic view illustrating a three dimensional shape measurement apparatus according to an exemplary embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

FIG. 1 is a schematic view illustrating a three dimensional shape measurement apparatus according to an exemplary embodiment of the present invention.

Referring to FIG. 1, a three dimensional shape measurement apparatus used to a method of measuring a three dimensional shape according to an exemplary embodiment of the present invention may include a measurement stage section 100, an image capturing section 200, a first illumination section including first and second illumination devices 300 and 400, a second illumination section 450, an image acquiring section 500, a module control section 600 and a central control section 700.

The measurement stage section 100 may include a stage 110 supporting a measurement target 10 and a stage transfer unit 120 transferring the stage 110. In an exemplary embodiment, according as the measurement target 10 moves with respect to the image capturing section 200 and the first and second illumination devices 300 and 400 by the stage 110, a measurement location may be changed in the measurement target 10.

The image capturing section 200 is disposed over the stage 110 to receive light reflected by the measurement target 10 and measure an image of the measurement target 10. That is, the image capturing section 200 receives the light that exits the first and second illumination devices 300 and 400 and is reflected by the measurement target 10, and captures a plan image of the measurement target 10.

The image capturing section 200 may include a camera 210, an imaging lens 220, a filter 230 and a lamp 240. The camera 210 receives the light reflected by the measurement target 10 and captures the plan image of the measurement target 10. The camera 210 may include, for example, one of a CCD camera and a CMOS camera. The imaging lens 220 is disposed under the camera 210 to image the light reflected by the measurement target 10 on the camera 210. The filter 230 is disposed under the imaging lens 220 to filter the light reflected by the measurement target 10 and provide the filtered light to the imaging lens 220. The filter 230 may include, for example, one of a frequency filter, a color filter and a light intensity control filter. The lamp 240 may be disposed under the filter 230 in a circular shape to provide the light to the measurement target 10, so as to capture a particular image such as a two-dimensional shape of the measurement target 10.

The first illumination device 300 may be disposed, for example, at a right side of the image capturing section 200 to be inclined with respect to the stage 110 supporting the measurement target 10. The first illumination device 300 may include a first light source unit 310, a first grating unit 320, a first grating transfer unit 330 and a first condensing lens 340. The first light source unit 310 may include a light source and at least one lens to generate light, and the first grating unit 320 is disposed under the first light source unit 310 to change the light generated by the first light source unit 310 into a first grating pattern light having a grating pattern. The first grating transfer unit 330 is connected to the first grating unit 320 to transfer the first grating unit 320, and may include, for example, one of a piezoelectric transfer unit and a fine linear transfer unit. The first condensing lens 340 is disposed under the first grating unit 320 to condense the first grating pattern light exiting the first grating unit 320 on the measurement target 10.

For example, the second illumination device 400 may be disposed at a left side of the image capturing section 200 to be inclined with respect to the stage 110 supporting the measurement target 10. The second illumination device 400 may include a second light source unit 410, a second grating unit 420, a second grating transfer unit 430 and a second condensing lens 440. The second illumination device 400 is substantially the same as the first illumination device 300 described above, and thus any further description will be omitted.

When the first grating transfer unit 330 sequentially moves the first grating unit 320 by N times and N first grating pattern lights are illuminated onto the measurement target 10 in the first illumination device 300, the image capturing section 200 may sequentially receive the N first grating pattern lights reflected by the measurement target 10 and capture N first pattern images. In addition, when the second grating transfer unit 430 sequentially moves the second grating unit 420 by N times and N second grating pattern lights are illuminated onto the measurement target 10 in the second illumination device 400, the image capturing section 200 may sequentially receive the N second grating pattern lights reflected by the measurement target 10 and capture N second pattern images. The 'N' is a natural number, and for example may be four.

In an exemplary embodiment, the first and second illumination devices 300 and 400 are described as an illumination apparatus generating the first and second grating pattern lights. Alternatively, the illumination device may be more than or equal to three. In other words, the grating pattern light may be illuminated onto the measurement target 10 in various directions, and various pattern images may be captured. For example, when three illumination devices are disposed in an equilateral triangle form with the image capturing section 200 being the center of the equilateral triangle form, three grating pattern lights may be illuminated onto the measurement target 10 in different directions. For example, when four illumination devices are disposed in a square form with the image capturing section 200 being the center of the square form, four grating pattern lights may be illuminated onto the measurement target 10 in different directions. In addition, the first illumination section may include eight illumination devices, and grating pattern lights may be illuminated onto the measurement target 10 in eight directions to capture an image.

The second illumination section 450 illuminates light for acquiring a two dimensional image of the measurement target 10 onto the measurement target 10. In an exemplary embodiment, the second illumination section 450 may include a red illumination 452, a green illumination 454, and a blue illumination 456. For example, the red illumination 452, the green illumination 454, and the blue illumination 456 may be disposed in a circular shape over the measurement target 10 to illuminate a red light, a green light and a blue light, respectively, and may be disposed at different heights as shown in FIG. 1.

The image acquiring section 500 is electrically connected to the camera 210 of the image capturing section 200 to acquire the pattern images according to the first illumination section from the camera 210 and store the acquired pattern images. In addition, the image acquiring section 500 acquires the two dimensional images according to the second illumination section from the camera 210 and store the acquired two dimensional images. For example, the image acquiring section 500 may include an image system that receives the N first pattern images and the N second pattern images captured in the camera 210 and stores the images.

The module control section 600 is electrically connected to the measurement stage section 100, the image capturing section 200, the first illumination device 300 and the second illumination device 400, to control the measurement stage section 100, the image capturing section 200, the first illumination device 300 and the second illumination device 400. The module control section 600 may include, for example, an illumination controller, a grating controller and a stage controller. The illumination controller controls the first and second light source units 310 and 410 to generate light, and the grating controller controls the first and second grating transfer units 330 and 430 to move the first and second grating units 320 and 420. The stage controller controls the stage transfer unit 120 to move the stage 110 in an up-and-down motion and a left-and-right motion.

The central control section 700 is electrically connected to the image acquiring section 500 and the module control section 600 to control the image acquiring section 500 and the module control section 600. Particularly, the central control section 700 receives the N first pattern images and the N second pattern images from the image system of the image acquiring section 500 to process the images, so that three dimensional shape of the measurement target may be measured. In addition, the central control section 700 may control a illumination controller, a grating controller and a stage controller of the module control section 600. Thus, the central control section may include an image processing board, a control board and an interface board.

Hereinafter, a method of inspecting a predetermined element mounted on a printed circuit board, which is employed as the measurement target 10 by using the above described three dimensional shape measurement apparatus will be described in detail.

Figure 2:
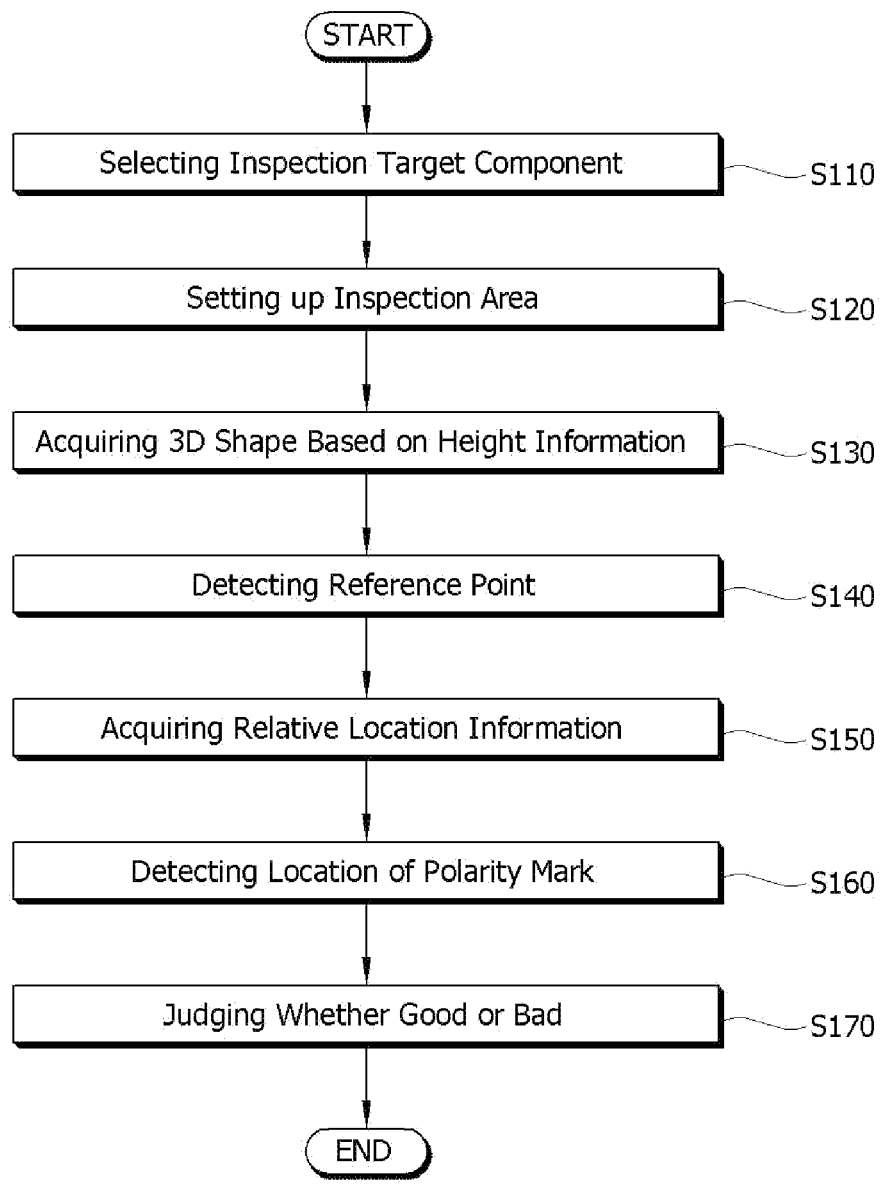
FIG. 2 is a flow chart showing a method of inspecting a three dimensional shape according to an exemplary embodiment of the present invention.
Figure 3:
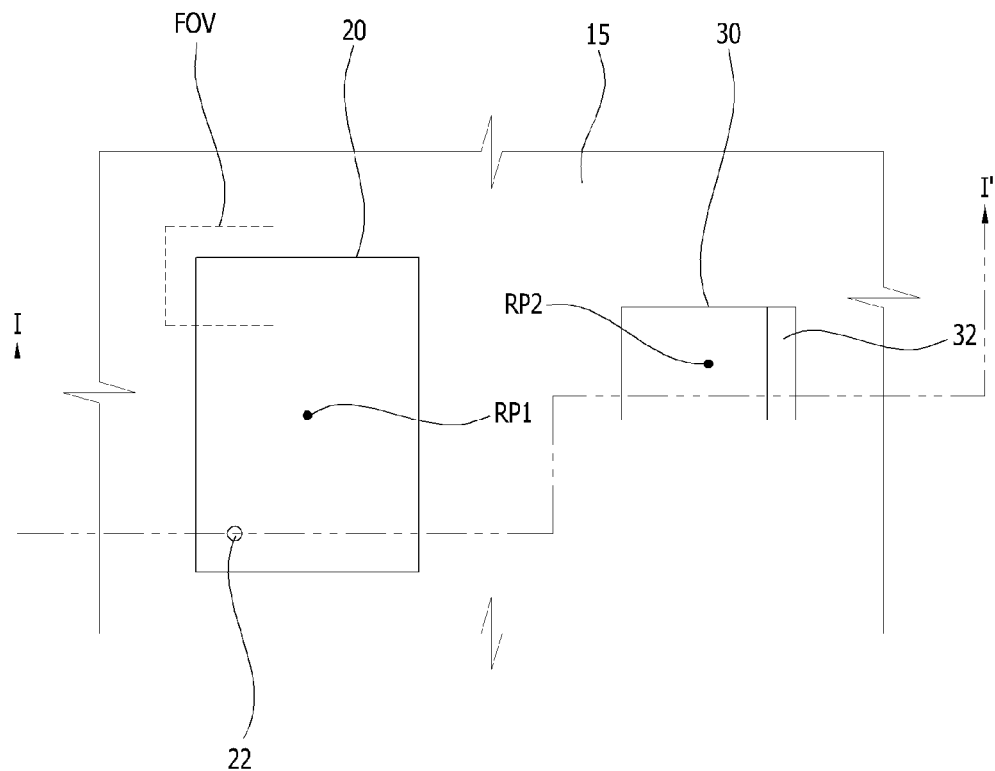
FIG. 3 is a plan view illustrating a component of a printed circuit board, which is a target of the method of inspecting a three dimensional shape shown in FIG. 2.
Figure 4:
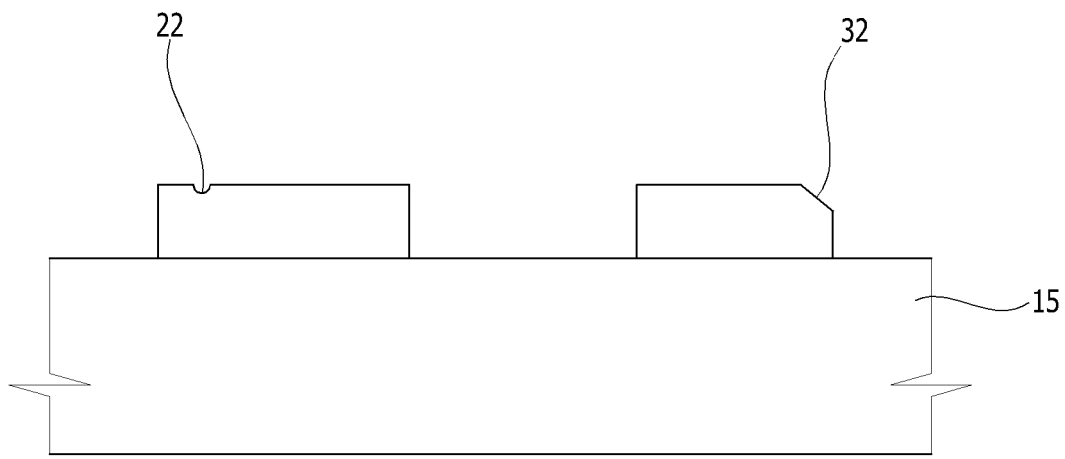
FIG. 4 is a cross-sectional view taken along a line I-I' in FIG. 3.

FIG. 2 is a flow chart showing a method of inspecting a three dimensional shape according to an exemplary embodiment of the present invention. FIG. 3 is a plan view illustrating a component of a printed circuit board, which is a target of the method of inspecting a three dimensional shape shown in FIG. 2. FIG. 4 is a cross-sectional view taken along a line I-I' in FIG. 3.

In a method of inspecting a three dimensional shape according to an exemplary embodiment of the present invention, as described in FIG. 1, a pattern image, which is generated by illuminating grating pattern light generated from an illumination device onto a measurement target, is captured, and a three dimensional shape based on height information of the measurement target is acquired by using the captured pattern image, to inspect whether the measurement target is good or bad.

Referring to FIGS. 2 to 4, in order to inspect a three dimensional shape according to an exemplary embodiment of the present invention, firstly, a predetermined inspection target component formed on a base board 10 of a printed circuit board (PCB) is selected as the measurement target in step S110. The inspection target component may include various typed circuit elements mounted on the PCB. For example, the inspection target component may include one of a first component 20 and a second component 30 illustrated in FIG. 3.

Then, an inspection area (field of view) FOV for the inspection target component is set up in step S120. For example, in case that the inspection target component corresponds to the first component 20, the inspection area FOV may be a rectangular shaped area corresponding to at least a portion of the inspection target component, as shown in FIG. 3.

Thereafter, a three dimensional shape based on the height information of the inspection target component is acquired in step S130. The process of acquiring the three dimensional shape may employ, for example, the method described in FIG. 1. In addition, in order to acquire the three dimensional shape, setting up the inspection area and acquiring the three dimensional shape in steps S120 and S130 may be repeatedly performed. For example, the inspection area FOV illustrated in FIG. 3 may be continuously moved from left to right and from up to down to perform the process.

Then, a reference point of the inspection target component is detected in step S140. The reference point may be set up on the inspection target component or adjacent to the inspection target component, and may be used as a reference point for checking a location of a polarity mark of the inspection target component, which will be described later. For example, in case that the inspection target component corresponds to the first component 20, the reference point may be a center point of the inspection target component like a first reference point RP1 shown in FIG. 3, and in case that the inspection target component corresponds to the second component 30, the reference point may be a center point of the inspection target component like a second reference point RP2 shown in FIG. 3. Alternatively, the reference point may correspond to any point, which is capable of defining a location of a polarity mark to be referenced, like a vertex point of the inspection target component. Area definition for setting up the reference point of the inspection target component, in other words, work of defining the shape of the inspection target component may be performed by using 2D image information acquired by a camera.

Thereafter, relative location information of a polarity mark formed on the inspection target component with respect to the reference point is acquired in step S150. The relative location information means for information indicating a location, at which the polarity mark theoretically exists, out of a place where the inspection target component is theoretically formed.

The relative location information of the polarity mark formed on the inspection target component with respect to the reference point, in an exemplary embodiment, may be acquired from CAD information, in which a shape of the inspection target component is recorded. The CAD information is, for example, corresponds to a design drawing including information for designing the PCB.

Alternatively, the relative location information of the polarity mark formed on the inspection target component with respect to the reference point may be acquired from learning information obtained by a learning mode.

The learning mode may be performed, for example, by searching board information in a database, performing learning of a bare board when the database does not include the board information as a result of searching, and after the learning of the bare board to produce board information of the bare board, storing the produced board information in the database, sequentially. In other words, in the learning mode, the bare board of the PCB is learned to obtain design standard information of the PCB, and the theoretical relative location information may be acquired by obtaining the learning information through the learning mode.

Then, it is judged whether the inspection target component is good or bad by checking whether the polarity mark exists or not by using the relative location information with respect to the reference point. It may be checked whether the polarity mark exists or not by using height information of the inspection target component.

Particularly, first, the location of the polarity mark is detected by using the relative location information with respect to the reference point and the measured height information of the inspection target component in step S160.

The polarity mark formed on the inspection target component may have a height different from an area on the inspection target component adjacent to the polarity mark. For example, the polarity mark may be a dimple 22, which is more recessed than the adjacent area, or a chamfer 32, which is formed at an edge that is cut to have a height lower than the adjacent area.

Thus, an expectation location of the polarity mark is set up by using theoretical relative location information with respect to the reference point, and it is checked whether the polarity mark exists or not at the expectation location by using the height information acquired in the above described process of acquiring the three dimensional shape in step S130, to thereby detect the location of the polarity mark.

Figure 5:
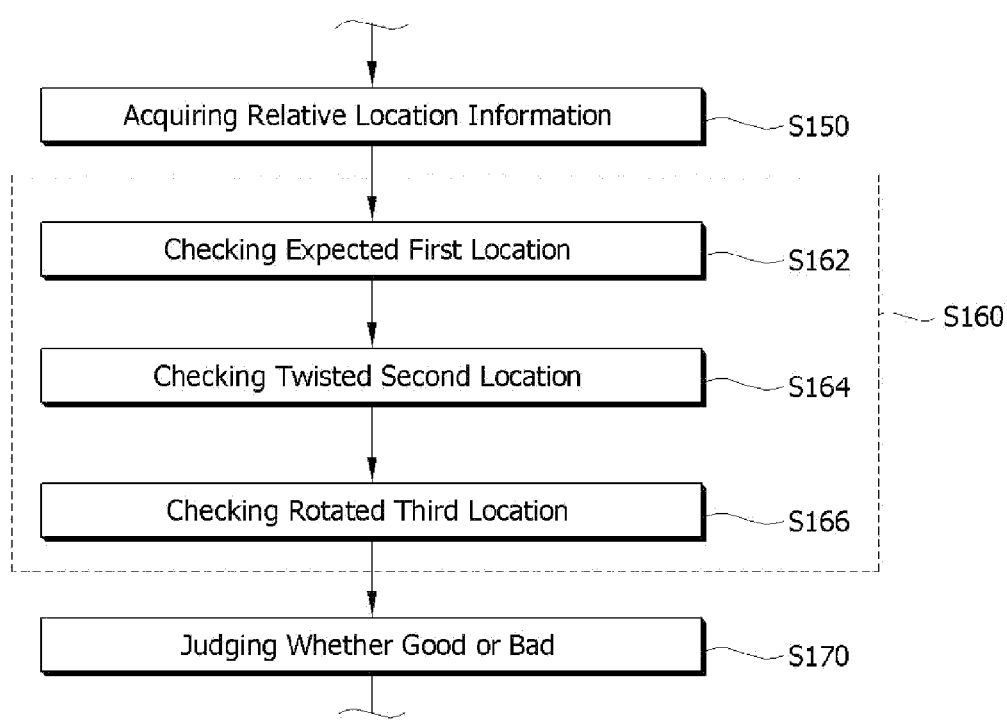
FIG. 5 is a flow chart showing a concrete exemplary embodiment for detecting a location of a polarity mark in FIG. 2.

FIG. 5 is a flow chart showing a concrete exemplary embodiment for detecting a location of a polarity mark in FIG. 2.

Referring to FIG. 5, in order to detect the location of the polarity mark, firstly, it is checked whether the polarity mark exists or not at a first location at which the polarity mark is expected to exist by using the measured height information of the inspection target component, by using the relative location information with respect to the reference point, to detect the location of the polarity mark in step S162. The first location may correspond to theoretical relative location information obtained from the CAD information or the learning information according to the learning mode, which is above described. When the polarity mark is located at the first location, the first location corresponds to the location of the polarity mark.

Then, in case that the polarity mark does not exist at the first location, it is checked whether the polarity mark exists or not at a second location at which the inspection target component is twisted by a predetermined angle, by using the measured height information of the inspection target component, and the location of the polarity mark is detected in step S164. The twisting by the predetermined angle indicates that the inspection target component is a little dislocated from a theoretical location. The predetermined angle may be defined according to a previously defined tolerance, and the second location corresponds to any location within the tolerance. Thus, it is checked that the polarity mark exists or not within a range of the twisting by the predetermined angle, and when the polarity mark exists, the second location corresponds to the location of the polarity mark.

Thereafter, in case that the polarity mark does not exist at the second location, it is checked whether the polarity mark exists or not at a third location at which the inspection target component is rotated by a predetermined angle, by using the measured height information of the inspection target component, and the location of the polarity mark is detected in step S166. The rotating by the predetermined angle indicates that the inspection target component is disposed wrong from a theoretical location by rotation of, for example, 90 degrees, 180 degrees, etc. The predetermined angle may be defined according to shape characteristics of the inspection target component, and the third location corresponds to a location that is rotated from the first location and/or the second location by the predetermined angle. Thus, it is checked that the polarity mark exists or not within a range of the rotation by the predetermined angle, and when the polarity mark exists, the third location corresponds to the location of the polarity mark.

Referring again to FIG. 2, thereafter, it is judged whether the inspection target component is good or bad by comparing the relative location information with respect to the reference point with the detected location of the polarity mark in step S170. In other words, the theoretical relative location information of the polarity mark with respect to the reference point is compared with the detected real location of the polarity mark, and the difference thereof is checked, thereby judging whether the inspection target component is good or bad.

For example, in case that the polarity mark exists at the first location or the second location, the inspection target component may be judged good, and in case that the polarity mark exists at the third location, the inspection target component may be judged bad.

As described above, the height information of the three dimensional shape measurement apparatus is used, to thereby easily and accurately performing the polarity inspection of the inspection target component, which is hard to perform by using an 2D image.

More simplified, it may be checked whether the polarity mark exists or not at a location at which the polarity mark is expected to exist by using the measured height information of the inspection target component, by using the relative location information with respect to the reference point, and it may be judged good in case that the polarity mark exists at the location, and bad in case that the polarity mark does not exist at the location.

Figure 6:
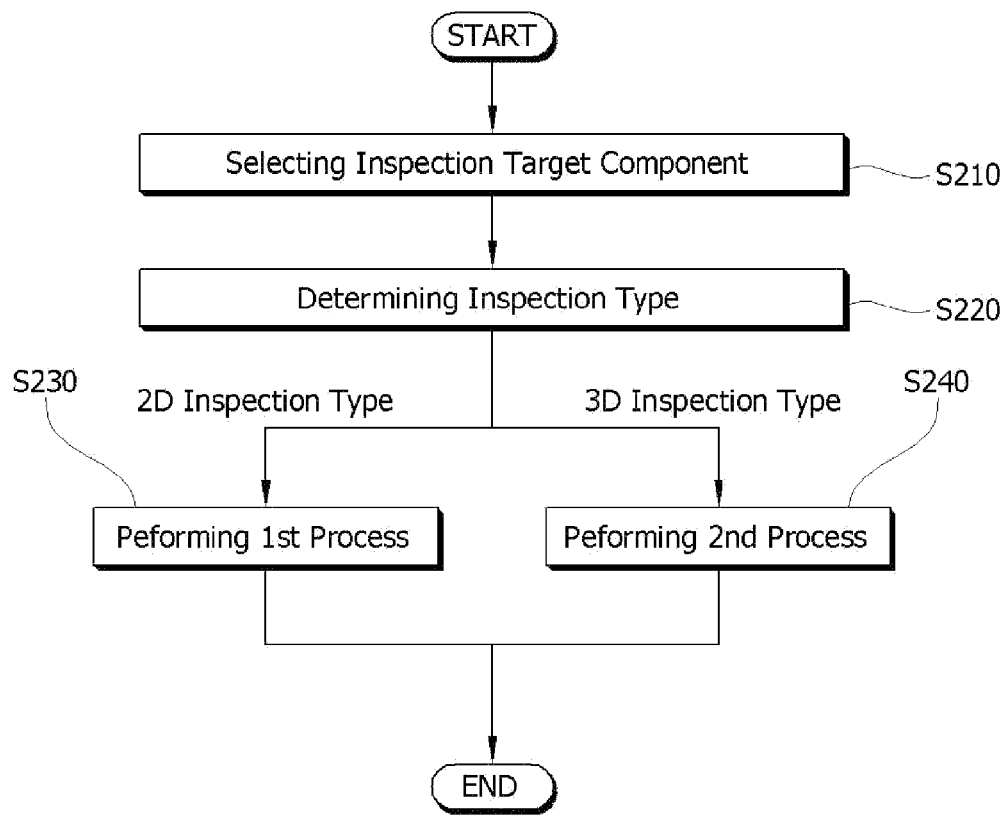
FIG. 6 is a flow chart showing a method of inspecting a three dimensional shape according to another exemplary embodiment of the present invention.

FIG. 6 is a flow chart showing a method of inspecting a three dimensional shape according to another exemplary embodiment of the present invention.

In a method of inspecting a three dimensional shape according to another exemplary embodiment of the present invention, a pattern image, which is generated by illuminating grating pattern light generated from an illumination device onto a measurement target, is captured, and a three dimensional shape based on height information of the measurement target is acquired by using the captured pattern image, to inspect whether the measurement target is good or bad, which is substantially the same as in FIG. 2.

Referring to FIG. 6, in order to inspect a three dimensional shape according to another exemplary embodiment of the present invention, firstly, a predetermined inspection target component formed on a base board of a PCB is selected as the measurement target in step S210. Then, an inspection type of the inspection target component is determined as a 2D inspection type or a 3D inspection type in step S220.

In an exemplary embodiment, after it is checked what component the inspection target component corresponds to, from CAD information or learning information acquired by a learning mode described in FIG. 2, the inspection type of the inspection target component may be determined according to previously defined inspection types for components.

For example, in case that the polarity of the inspection target component is displayed by a 3D shape such as a dimple or a chamfer described above, the inspection type may be determined as a 3D inspection type.

In addition, in case that the polarity of the inspection target component is displayed by a 2D shape, the inspection type may be determined as a 2D inspection type. In an exemplary embodiment, the inspection type of the inspection target component may be determined as the 2D inspection type, in case that the polarity mark formed on the inspection target component has a height substantially the same as an area adjacent to the polarity mark on the inspection target component. The inspection target component may employ one of a symbol that is formed on a predetermined area of an upper face, a portion that is colored different from the area adjacent to the polarity mark, and an area definition that is indicated to be discriminated from the area adjacent to the polarity mark as the polarity mark.

Thereafter, in case that the inspection type of the inspection target component is determined as a 2D inspection type, a first inspection process is performed in step S230, and in case that the inspection type of the inspection target component is determined as a 3D inspection type, a second inspection process is performed in step S240.

Figure 7:
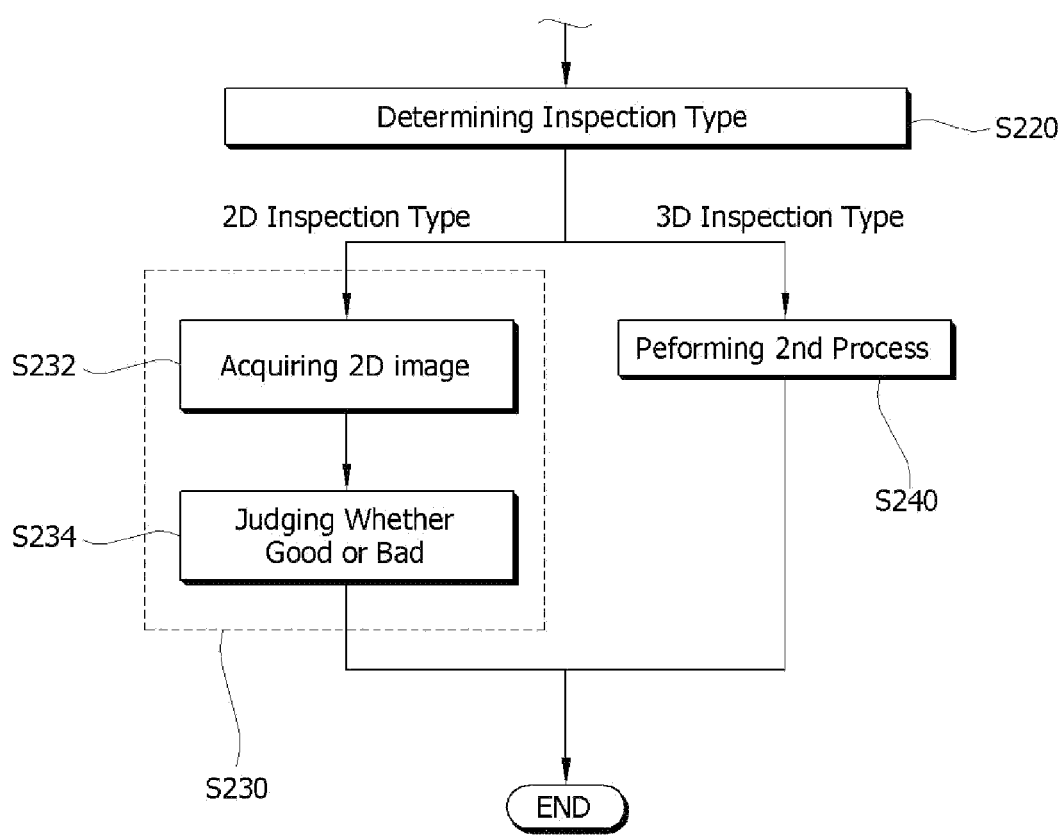
FIG. 7 is a flow chart concretely showing a first inspection process in FIG. 6.

FIG. 7 is a flow chart concretely showing a first inspection process in FIG. 6.

Referring to FIG. 7, in order to perform the first inspection process, firstly, a 2D image of the inspection target component is acquired in step S232. In an exemplary embodiment, the 2D image may be acquired by the second illumination section 450 described in FIG. 1. Alternatively, the 2D image may be acquired by various other methods, in which a 2D plan image can be obtained.

Then, the location of the polarity mark of the inspection target component is analyzed to judge whether the inspection target component is good or bad in step S234. That is, it is checked whether the location of the polarity mark corresponds to the theoretical location by using the 2D image, and it may be judged whether the inspection target component is good or bad.

Figure 8:
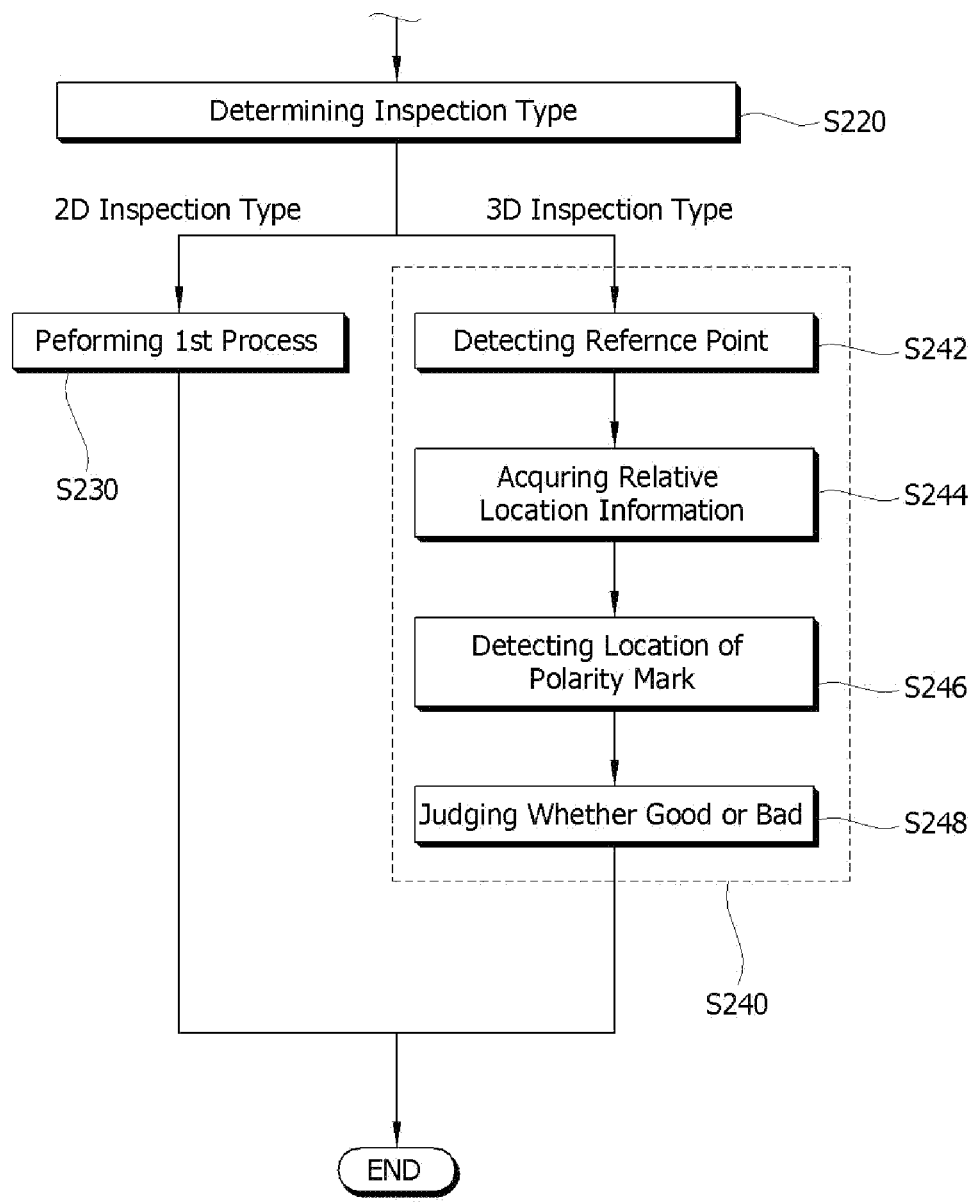
FIG. 8 is a flow chart concretely showing a second inspection process in FIG. 6.

FIG. 8 is a flow chart concretely showing a second inspection process in FIG. 6.

Referring to FIG. 8, in order to perform the second inspection process, firstly, the reference point of the inspection target component is detected in step S242. Then, the relative location information of the polarity mark formed on the inspection target component with respect to the reference point is acquired in step S244. Thereafter, a location of the polarity mark is detected by using height information acquired during measuring the relative location information with respect to the reference point and a three dimensional shape of the inspection target component in step S246. Then, it is judged whether the inspection target component is good or bad by comparing the relative location information of the polarity mark with respect to the reference point with the location of the detected polarity mark in step S248.

The above described steps S242, S244, S246, and S248 are substantially the same as steps S140, S150, S160, and S170 described in FIGS. 2 to 5, respectively. Thus, any further description will be omitted.

As described in FIGS. 2 to 5, after step S150, it is checked whether the polarity mark exists or not by using the relative location information with respect to the reference point, to judge whether the inspection target component is good or bad. More simplifying steps S160 and S170, it may be checked whether the polarity mark exists or not at a location at which the polarity mark is expected to exist by using the measured height information of the inspection target component, by using the relative location information with respect to the reference point, and it may be judged good in case that the polarity mark exists at the location, and bad in case that the polarity mark does not exist at the location.

As described above, the polarity inspection is performed divided into the 2D inspection type and the 3D inspection type according to the inspection type of the inspection target component, and the polarity inspection may be easily and accurately performed.

According to the present invention, the reference point of the inspection target component is detected, and the theoretical location information with respect to the reference point is compared with the real location of the polarity mark detected by the height information of the inspection target component, to judge whether the inspection target component is good or bad. Thus, the polarity inspection may be easily and accurately performed.

In addition, the height information of the inspection target component may be acquired by information from three dimensional shape measurement. Thus, additional required inspection time may not be much increased.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of inspecting a three dimensional shape comprising:
   selecting a predetermined inspection target component formed on a board as the measurement target;
   acquiring a shape of the inspection target component, the shape being acquired as a three dimensional shape based on height information, wherein acquiring the shape of the inspection target component comprises generating light from an illumination device and capturing an image utilizing an image capturing device;
   setting a reference point capable of defining a location of a polarity mark of the inspection target component, the polarity mark comprising a height different than an adjacent area of the inspection target;
   acquiring information for a relative location of a polarity mark formed on the inspection target component with respect to the reference point, the relative location of the polarity mark corresponding to a location at which the polarity mark theoretically exists; and
   judging whether the inspection target component is good or bad by checking whether the polarity mark exists or not at the relative location with respect to the reference point by using the height information of the inspection target component.

2. The method of claim 1, wherein the light generated from the illumination device corresponds to grating pattern light, and the captured image corresponds to a pattern image.

3. The method of claim 1, prior to acquiring the shape of the inspection target component,
   further comprising setting up an inspection area of the inspection target component.

4. The method of claim 1, wherein in judging whether the inspection target component is good or bad by checking whether the polarity mark exists or not at the relative location with respect to the reference point by using the height information of the inspection target component,
   whether the polarity mark exists or not at a location at which the polarity mark is expected to exist by using the measured height information of the inspection target component is checked by using the relative location with respect to the reference point, to judge that the inspection target component is good in case that the polarity mark exists and the inspection target component is bad in case that the polarity mark does not exist.

5. The method of claim 1, wherein judging whether the inspection target component is good or bad by checking whether the polarity mark exists or not at the relative location with respect to the reference point by using the height information of the inspection target component comprising:
   detecting a location of the polarity mark by using the height information of the inspection target component; and
   judging whether the inspection target component is good or bad by comparing the relative location with respect to the reference point with the detected location of the polarity mark.

6. The method of claim 5, wherein detecting a location of the polarity mark by using the height information of the inspection target component comprising:
   checking whether the polarity mark exists or not at a first location at which the polarity mark is expected to exist by using the relative location with respect to the reference point, by using the measured height information of the inspection target component, to detect the location of the polarity mark; and
   detecting the location of the polarity mark by checking whether the polarity mark exists or not at a second location at which the inspection target component is twisted by a predetermined angle, by using the measured height information of the inspection target component, in case that the polarity mark does not exist at the first location.

7. The method of claim 5, wherein detecting a location of the polarity mark by using the height information of the inspection target component comprising:
   checking whether the polarity mark exists or not at a first location at which the polarity mark is expected to exist by using the relative location with respect to the reference point, by using the measured height information of the inspection target component, to detect the location of the polarity mark;
   detecting the location of the polarity mark by checking whether the polarity mark exists or not at a second location at which the inspection target component is twisted by a predetermined angle, by using the measured height information of the inspection target component, in case that the polarity mark does not exist at the first location; and
   detecting the location of the polarity mark by checking whether the polarity mark exists or not at a third location at which the inspection target component is rotated by a predetermined angle, by using the measured height information of the inspection target component, in case that the polarity mark does not exist at the second location.

8. The method of claim 1, wherein the polarity mark formed on the inspection target component has a height different from an area on the inspection target component adjacent to the polarity mark.

9. The method of claim 8, wherein the inspection target component employs one of a dimple formed on an upper face and a chamfer formed at an edge serving as the polarity mark.

10. The method of claim 1, wherein the information for the relative location of the polarity mark formed on the inspection target component with respect to the reference point is acquired from computer-aided design (CAD) information, in which a shape of the inspection target component is recorded, or learning information obtained by a learning mode.

11. A method of inspecting a three dimensional shape comprising:
    selecting a predetermined inspection target component formed on a base board of a printed circuit board (PCB) as the measurement target;
    acquiring a three dimensional shape of the inspection target component based on height information of the measurement target, wherein acquiring the three dimensional shape of the inspection target component comprises generating light from an illumination device and capturing an image utilizing an image capturing device;
    determining an inspection type of the inspection target component as a 2D inspection type or a 3D inspection type;
    performing a first inspection process, in case that the inspection type of the inspection target component is determined as the 2D inspection type; and
    performing a second inspection process, in case that the inspection type of the inspection target component is determined as the 3D inspection type, wherein the first inspection process comprises:
acquiring a 2D image of the inspection target component; and
analyzing a location of a polarity mark of the inspection target component to judge whether the inspection target component is good or bad, wherein the second inspection process comprises:
setting a reference point capable of defining a location of a polarity mark of the inspection target component, the polarity mark comprising a height different than an adjacent area of the inspection target;
acquiring information for a relative location of the polarity mark formed on the inspection target component with respect to the reference point, the relative location of the polarity mark corresponding to a location at which the polarity mark theoretically exists;
detecting a location of the polarity mark by using the information for the relative location with respect to the reference point and height information acquired during acquiring the three dimensional shape of the inspection target component; and
judging whether the inspection target component is good or bad by checking whether the polarity mark exists or not at the relative location of the polarity mark with respect to the reference point by using the acquired height information.

12. The method of claim 11, wherein a first area of the inspection target component is determined as the 2D inspection type, and a second area of the inspection target component is determined as the 3D inspection type.

13. The method of claim 11, wherein the inspection type of the inspection target component is determined as the 2D inspection type, in case that the polarity mark formed on the inspection target component has a height substantially the same as an area on the inspection target component adjacent to the polarity mark.

14. The method of claim 13, wherein the inspection target component employs one of a symbol that is formed on a predetermined area of an upper face, a portion that is colored different from the area adjacent to the polarity mark, and an area definition that is indicated to be discriminated from the area adjacent to the polarity mark as the polarity mark.

15. The method of claim 11, wherein the inspection type of the inspection target component is determined as the 3D inspection type, in case that the polarity mark formed on the inspection target component has a height different from an area on the inspection target component adjacent to the polarity mark.

* * * * *